US00RE33954E

United States Patent [19]

Honda et al.

[11] E Patent Number: Re. 33,954

[45] Reissued Date of Patent: Jun. 9, 1992

[54] ROTOR BLADE ASSEMBLY

[75] Inventors: Keith T. Honda, Manchester; Stephen L. Smith, South Windsor; Peter E. Voyer, Tolland, all of Conn.

[73] Assignee: United Technologies Corporation, Hartford, Conn.

[21] Appl. No.: 656,337

[22] Filed: Dec. 24, 1990

Related U.S. Patent Documents

Reissue of:

[64] Patent No.: 4,451,205
Issued: May 29, 1984
Appl. No.: 351,061
Filed: Feb. 22, 1982

[51] Int. Cl.[5] ..... F01D 5/30

[52] U.S. Cl. ..... 416/219 R; 416/196 R; 416/220 R

[58] Field of Search ..... 416/219 R, 219 A, 190, 416/191, 193, 196, 220 R, 220 A

[56] References Cited

U.S. PATENT DOCUMENTS

| | | | |
|---|---|---|---|
| 3,628,890 | 12/1971 | Sayre et al. | 416/220 |
| 3,720,481 | 3/1973 | Motta | 416/220 |
| 3,891,351 | 6/1975 | Norbut | 416/219 R |
| 4,142,836 | 3/1979 | Glenn | 416/219 R |
| 4,169,694 | 10/1979 | Sandy | 416/219 R |
| 4,265,595 | 5/1981 | Bucy, Jr. et al. | 416/220 |
| 4,326,836 | 4/1982 | Fitton | 416/196 R |

FOREIGN PATENT DOCUMENTS

| | | | |
|---|---|---|---|
| 632001 | 7/1936 | Fed. Rep. of Germany | 416/219 R |
| 1025421 | 3/1958 | Fed. Rep. of Germany | 416/219 R |
| S108277 | 12/1967 | Fed. Rep. of Germany . | |
| 1083734 | 1/1955 | France | 416/219 R |
| 312864 | 11/1933 | Italy | 416/220 |
| 46-29565 | 8/1971 | Japan . | |
| 49-75904 | 7/1974 | Japan . | |
| 1332935 | 10/1973 | United Kingdom | 416/219 R |

*Primary Examiner*—John T. Kwon

[57] ABSTRACT

Rotor blade and disk structures enabling the disassembly and reassembly of a single rotor blade are disclosed. The concepts are particularly suited to configurations employing interlocking mid-span shrouds which inhibit the withdrawal of a single blade from a disk.

In one specific geometry the rotor blade root section (20) and the disk attachment slot (24) are contoured to provide increasing clearance between the bottom of the blade root section and the attachment slot as the blade is withdrawn axially from the slot. Rocking of the blade within the provided clearance enables withdrawal of the blade around the shroud segments (30,32) and airfoil sections (16) of the adjacent blades (12).

1 Claim, 5 Drawing Sheets

FIG. 1
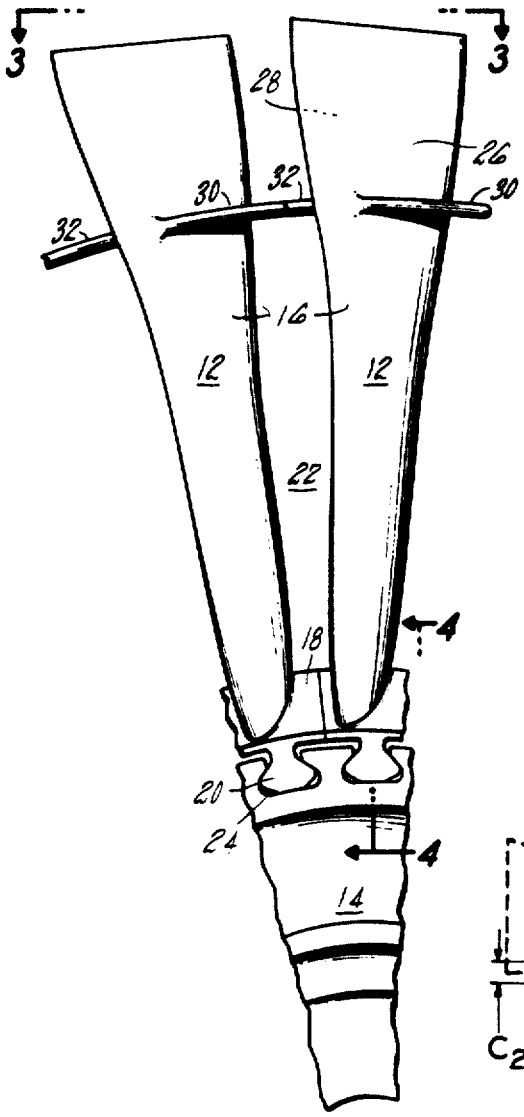
FIG. 4
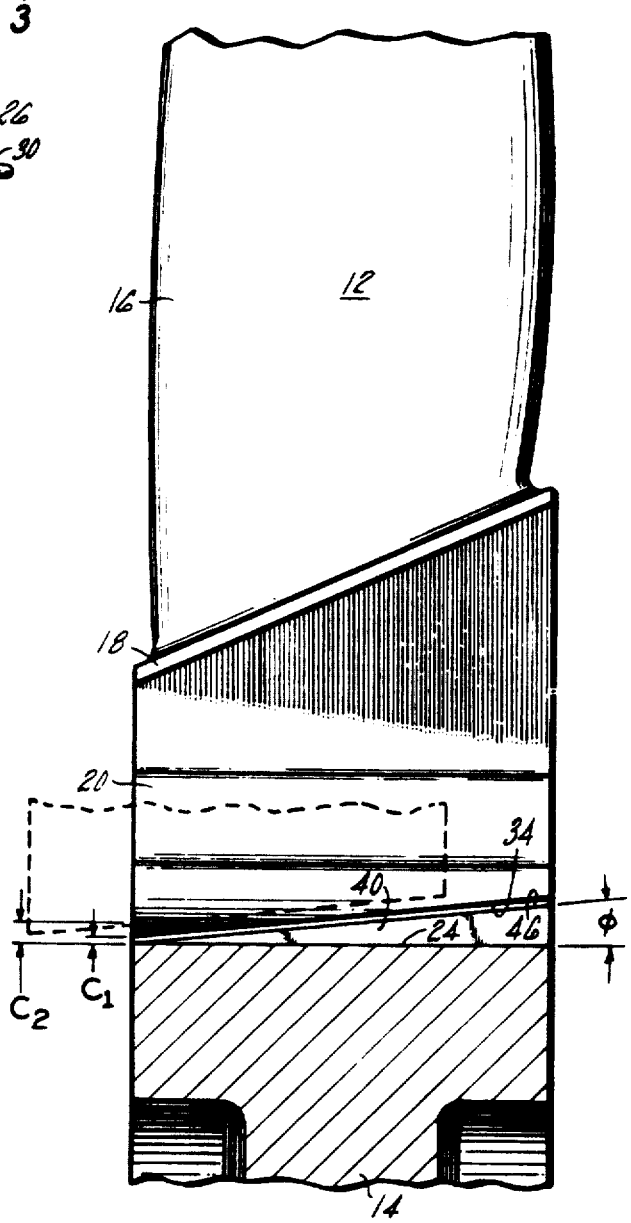
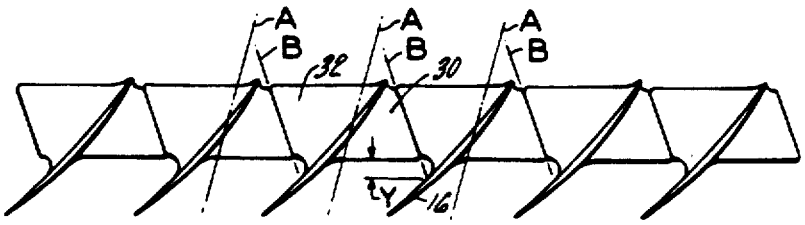
FIG. 3

ROTOR BLADE ASSEMBLY

Matter enclosed in heavy brackets [ ] appears in the original patent but forms no part of this reissue specification; matter printed in italics indicates the additions made by reissue.

DESCRIPTION

TECHNICAL FIELD

This invention relates to axial flow rotary machines, and more particularly to the rotor blades of such machines.

The concepts were developed in the aircraft gas turbine engine industry to enable the disassembly of single fan blades from the fan sections of turbofan engines, but have wider applicability both within that industry and others as well.

BACKGROUND ART

Modern aircraft gas turbines are of the turbofan type having large rotor blades usually at the forward end of the engine. The blades are termed "fan blades" and are utilized to accelerate air directed thereover in a manner much the same as a propeller.

Being located at the forward end of the engine, the blades are susceptible to foreign object damage as a result of debris picked up along the airport runway and ingested into the engine. Large birds are not an infrequent cause of fan damage. Damaged blades must be replaced to restore aerodynamic efficiency to the fan and to prevent destructive rotor imbalance.

Fan blade roots are conventionally formed to a dovetail cross-section geometry and extend from fore to aft across the rim of a supporting disk. The root attachments are usually canted circumferentially with respect to the centerline or axis of the engine. Blades of long span have one or more shrouds at an intermediate position along the span of the blades or at the blade tips. Such a shroud is formed of elements extending laterally from the pressure and suction sides of the blades into opposing relationship with the shroud elements of adjacent blades. In combination, the shroud elements form an annular ring when viewed in a direction along the axis of the engine. The plane of opposing relationship between adjacent shroud elements is nonparallel to the axis of the blade attachment, thereby locking each individual blade into the assembly.

To avoid the expense and necessity of removing all blades of a rotor stage in order to replace a single blade, scientists and engineers in the industry are searching for new blade concepts and techniques of this assembly.

DISCLOSURE OF INVENTION

According to the present invention, the disassembly of a single shrouded blade from an axial flow rotary machine is enabled by providing a wedge-shaped protrusion at the base of the disk attachment slot such that the blade can be rocked about the wedge-shaped protrusion upon partial withdrawal of the blade from the slot to effect disengagement of the blade from the shrouds of adjacent blades.

Primary features of the present invention are the wedge-shaped protrusions extending outwardly from the base of each disk attachment slot and the tapered surfaces at the bottoms of the root sections of the corresponding blades. Partial withdrawal of the root section of a blade from the corresponding attachment slot increases the radial clearance therebetween and enables rocking of the blade about the wedge-shaped protrusion.

A principal advantage of the present invention is the enabled disassembly of a single blade from the rotor assembly. In an aircraft installation, removal of a fan blade can be accomplished in situ without removing the engine from the aircraft. Such disassembly is accomplished without recourse to increased part clearances in the installed condition. Rocking the blade in a first direction about the wedge-shaped protrusion enables partial withdrawal notwithstanding the nonparallel relationship of the axis of the attachment slot and the planes along which adjacent shrouds abut. Rocking of the blade in a second direction permits circumferential displacement of the blade shroud about the trailing edge of the adjacent blade, such that the blade may be completely withdrawn from the attachment slot.

The forgoing, and other features and advantages of the present invention, will become more apparent from the following description and the accompanying drawing.

BRIEF DESCRIPTION OF THE DRAWING

FIG. 1 is a simplified front elevation view of a portion of the fan assembly of a turbofan gas turbine engine;

FIG. 3 is a view taken in the direction 3—3 as shown in FIG. 1;

FIG. 4 is a sectional view taken along the line 4—4 as shown in FIG. 1;

BEST MODE FOR CARRYING OUT THE INVENTION

Figure 2:
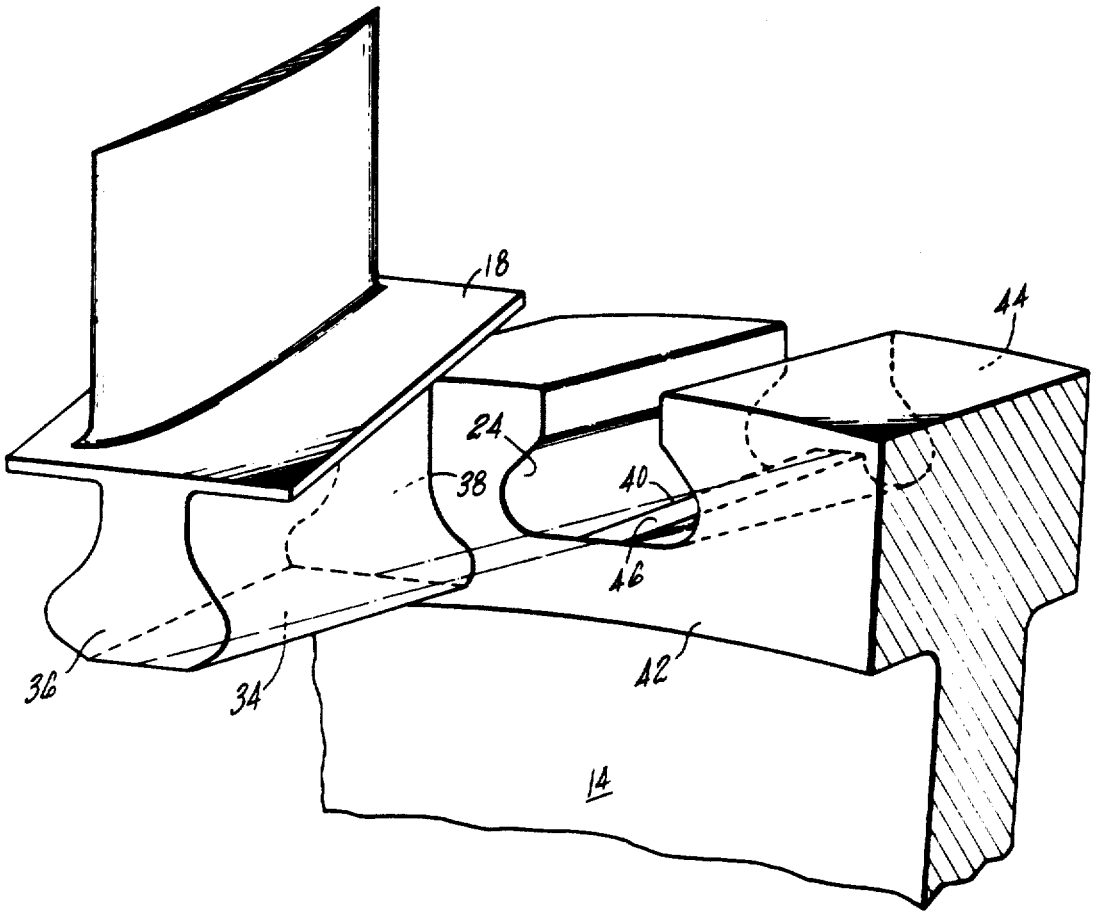
FIG. 2 is an exploded perspective view illustrating the wedge against which the blade root seats.

The best mode for carrying out the invention is described with respect to the fan section of a turbofan gas turbine engine. A portion of a fan rotor assembly is illustrated in the FIG. 2 front elevation view. A plurality of rotor blades 12 extend outwardly from the periphery of a rotor disk 14. Each rotor blade has an airfoil section 16, a platform section 18 and a root section 20. Each platform section defines a portion of the inner wall of the flowpath 22 for working medium gases. Each root section engages a corresponding attachment slot 24 at the periphery of the disk. The airfoil section of each blade has a suction side 26 and a pressure side 28. Shroud segments 30 and 32 extend laterally from the suction and pressure sides of the blade respectively into opposing relationship with the shroud segments of adjacent blades. In composite the shroud segments of adjacent blades form an annular ring extending circumferentially around the engine. The shroud illustrated is positioned at a midpoint along the span of the blade and is termed a "mid-span" shroud. The spanwise location of the shroud varies with engine design. Multiple shrouds are employed in some embodiments and in others a shroud is positioned at the tips of the blades.

The shape of each blade root section and the geometry of the corresponding attachment slot are shown in the FIG. 2 exploded, perspective view. The attachment geometry is of the generic type known as a "dovetail root". The geometry is modified, however, from the conventional form in that the bottom surface 34 of the blade root is tapered from the leading edge 36 to the trailing edge 38, forming a root of decreasing cross section. The attachment slot 24 has a wedge-shaped protrusion 40 extending from the center portion of the bottom of the attachment slot from the front side 42 to the rear side 44 of the disk. The top surface 46 of the wedge-shaped protrusion and the bottom surface of the blade root section are matched to an angle $\phi$ measured with respect to a plane parallel to the engine's centerline. The root section of the rotor blade and the attachment slot of the disk are contoured to provide increasing clearance between the bottom of the blade root section and the attachment slot as the blade is axially withdrawn from the slot. The blades 12 are trapped axially on the disk 14 in the assembled mode by conventional means not specifically illustrated.

Concepts integrated into the described apparatus enable the in situ disassembly and reassembly of a single rotor blade, such as might be required after operation in an engine on account of foreign object damage to the blades. In conventional construction such in situ disassembly and reassembly of a single blade is inhibited by circumferential interference between adjacent shroud segments and axial interference of the shroud segments with forwardly extending portions of the adjacent airfoil sections. As is viewable in FIG. 3, the axis A of the blade root attachment may not be parallel to the plane of intersection B with the result that the blades held in axial position on the disk are interlocked. Even without direct restrain each blade is incapable of axial displacement greater than the distance Y between the suction side shroud segment 30 of that blade and the airfoil section 16 of the adjacent blade.

The revised root section and attachment slot geometry of the present invention enables combined axial and circumferential blade displacement freeing the shroud segments of the blade to be withdrawn from both the adjacent shroud segments and the airfoid section of the adjacent blade. The FIG. 4 illustrates increased clearance between the bottom surface 34 of the blade root section and the top surface 46 of the wedge-shaped protrusion 40 at the base of the attachment slot. In the installed condition the clearance is of a magnitude $C_1$; in the partial withdrawn condition as represented by the dotted configuration, the clearance is of a magnitude $C_2$.

Figure 5:
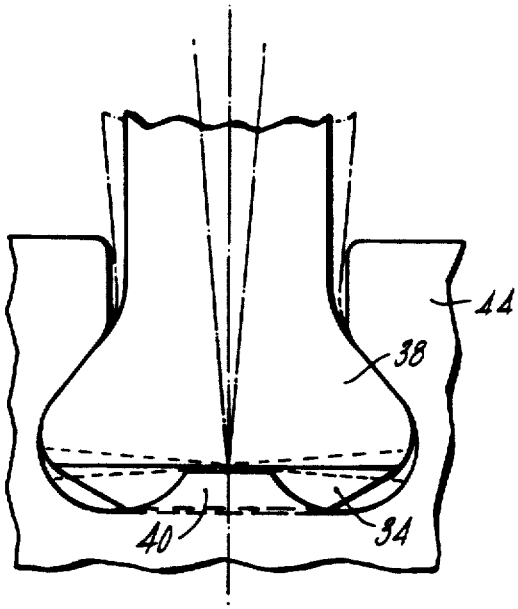
FIG. 5 is an enlarged view of the fan blade root illustrating the ability of a partially removed blade to tilt about the wedge at the base of the attachment slot.

The increased clearance upon partial axis withdrawal enables the blade to initially rock about the wedge-shaped protrusion 40 in accommodation of the differential alignment of the blade root axis A and the plane of intersection B of the adjacent shroud segments and to subsequently rock about the wedge-shaped protrusion 40 to rotate the suction side shroud segment circumferentially free of the adjacent airfoil section. The ability of the blade to rock about the wedge-shaped protrusion in a partially withdrawn condition is viewable in FIG. 5.

Figure 6:
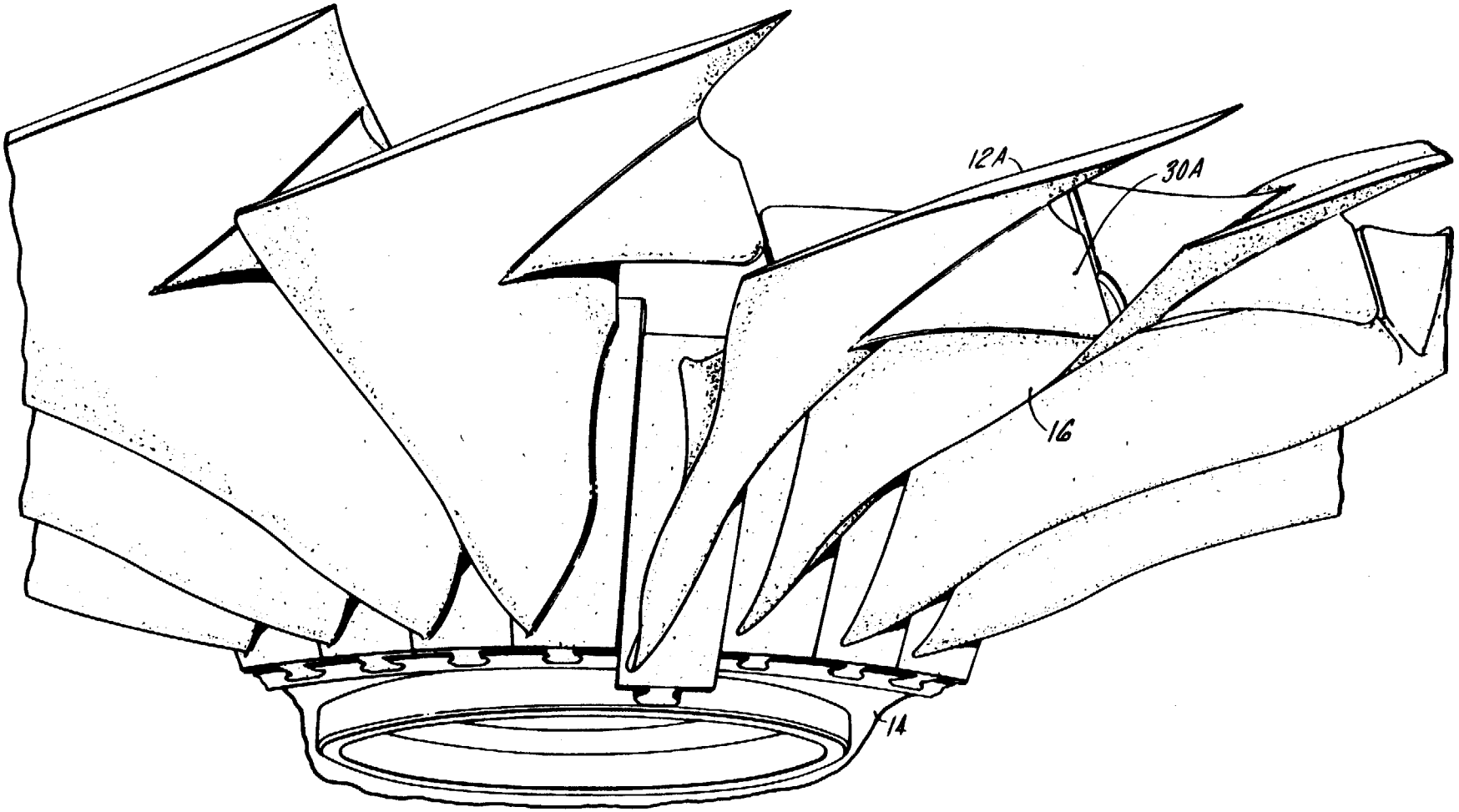
FIG. 6 is a perspective view illustrating partial withdrawal of a single rotor blade from the assembly.
Figure 7:
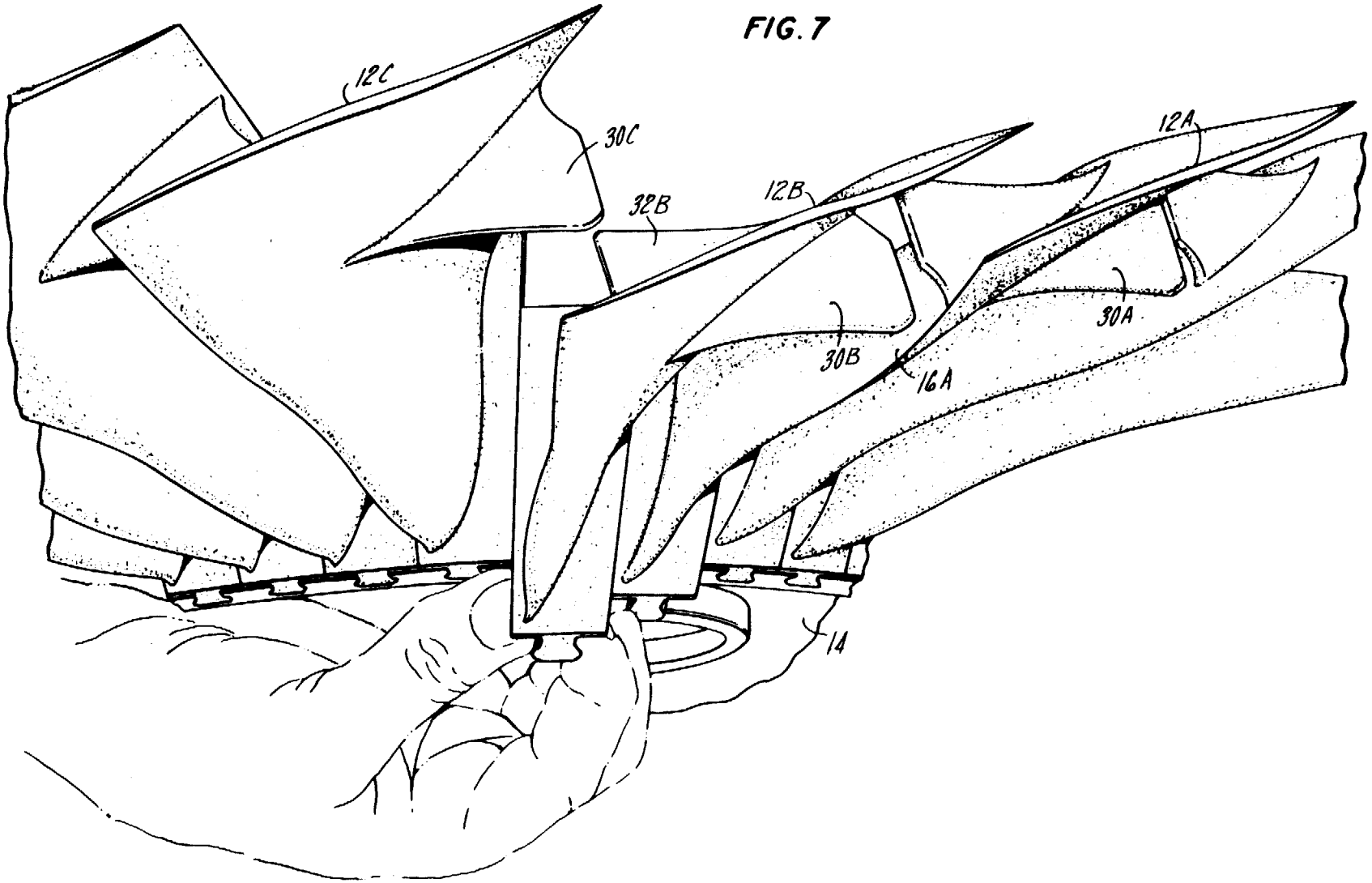
FIG. 7 is a perspective view illustrating the sequential partial withdrawal of two adjacent rotor blades with the shroud of the most forwardly withdrawn blade free of interference with the shroud of the adjacent blade.
Figure 8:
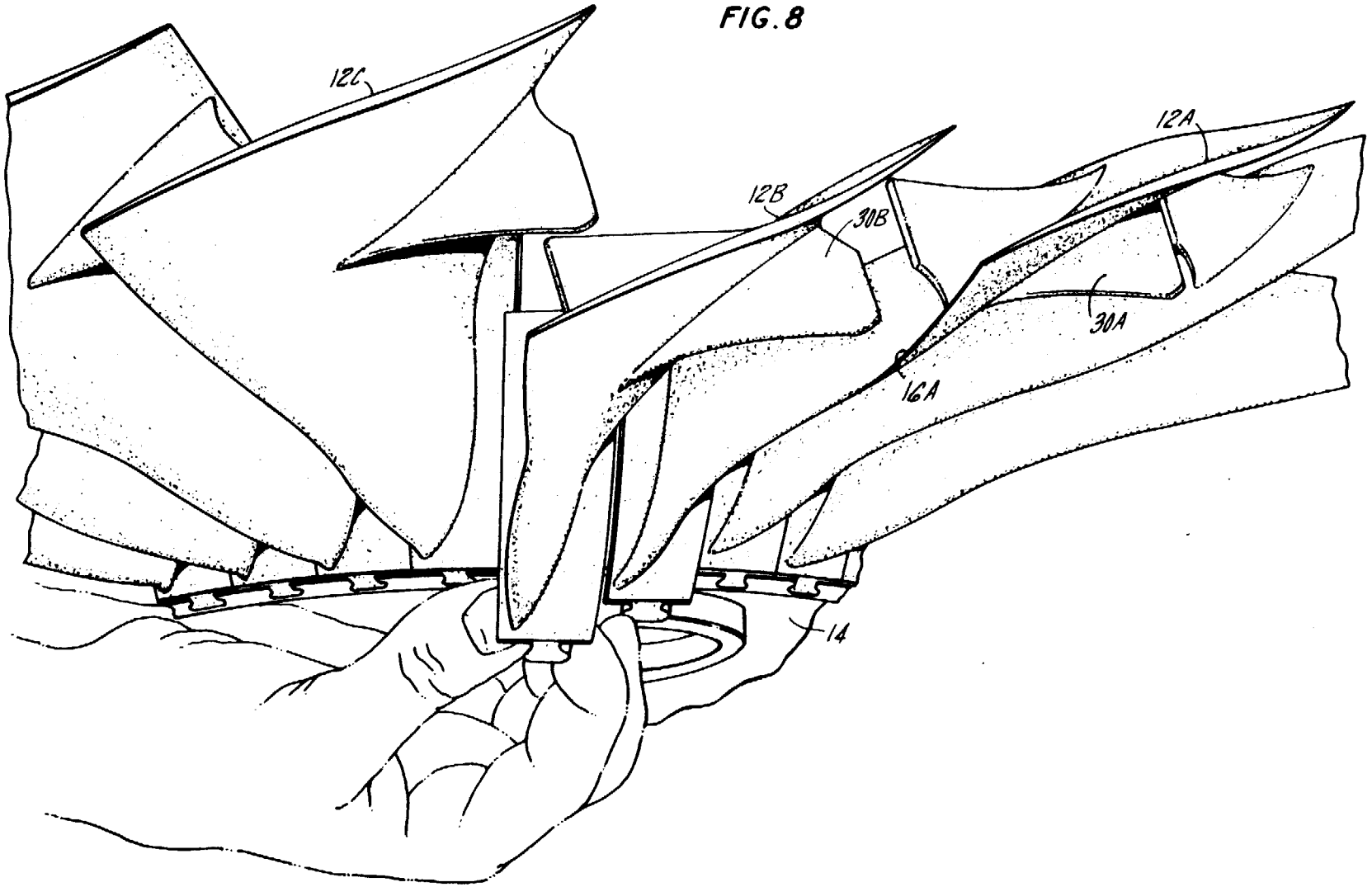
FIG. 8 is a perspective view illustrating circumferential displacement of the most forwardly withdrawn blade to a position at which the shroud of the blade is free of interference with the airfoil section of the adjacent blade.

The sequential steps for withdrawing a single rotor blade from a rotor disk in one embodiment are shown in FIGS. 6–8. Although not shown in the installed condition on a gas turbine engine, the principles of disassembly and reassembly of the blades 12 from the rotor disk 14 are identical. Direct axial restraint trapping the blades on the disk in the fully assembled mode has been removed.

In FIG. 6 one of the blades 12A is adjusted forwardly on the disk 14 until the suction side shroud segment 30A abuts the airfoil section 16 of the adjacent blade. The blade rocks slightly in the attachment slot in a clockwise direction to accommodate the angular mismatch of the root axis and the shroud segment plane of the intersection. In FIG. 7 a second rotor blade 12B is adjusted forwardly in the disk until the suction side shroud segment 30B of the second blade abuts the airfoil section 16A of the adjacent blade. In the embodiment illustrated the pressure side shroud segment 32B is free of circumferential interference with the suction side shroud segment 30C of the adjacent blade 12C. The number of blades 12 which must be forwardly adjusted depends upon the particular embodiment including such factors as the width of the shroud segments and the geometry of the adjacent airfoil section in the vicinity of the shroud.

In FIG. 8 the blade 12B is rotated in the attachment slot in a counterclockwise direction to a position at which the suction side segment 30B of the blade is free to move axially past the airfoil section 16A of the adjacent blade. In this position full withdrawal of a single blade from the disk can be made. Reassembly of the single blade is made by a procedure reverse to that by which disassembly is made.

Although the invention has been shown and described with respect to detailed embodiments thereof, it should be understood by those skilled in the art that various changes in form and detail thereof may be made without departing from the spirit and the scope of the claimed invention.

We claim:

[1. For an axial flow gas turbine engine having a rotor assembly of a type including an array of rotor blades extending outwardly from the periphery of a rotor disk and wherein the airfoil section of each of said rotor blades has shroud segments extending laterally from the suction and pressure sides thereof into opposing relationship with corresponding shroud segments of the adjacent rotor blades, the improvement comprising:

means for attaching each rotor blade to a corresponding attachment slot at the periphery of the rotor disk wherein the root section of the blade and the attachment slot of the disk are contoured to provide increasing clearance between the bottom of the blade root section and the attachment slot as the blade is withdrawn axially from the slot.]

2. [The invention according to claim 1] *For an axial flow gas turbine engine having a rotor assembly of a type including an array of rotor blades extending outwardly from the periphery of a rotor disk and wherein the airfoil section of each of said rotor blades has shroud segments extending laterally from the suction and pressure sides thereof into opposing relationship with corresponding shroud segments of the adjacent rotor blades, the improvement comprising:*

*means for attaching each rotor blade to a corresponding attachment slot at the periphery of the rotor disk wherein the root section of the blade is a dovetail-*

*shaped root section, and wherein said root section and the attachment slot of the disk are contoured to provide increasing clearance between the bottom of the blade root section and the attachment slot as the blade is withdrawn axially from the slot and are contoured such that the blade root section is able to rock within such clearance,* wherein the disk attachment slot has a wedge-shaped protrusion extending from the center portion of the bottom of the attachment slot and tapered to increasing cross section from the front to the rear sides of the disk, and wherein the rotor blade root section has a bottom surface of taper corresponding to that of the wedge-shaped protrusion of the attachment slot.

* * * * *